US006615353B1

(12) United States Patent
Hashiguchi (10) Patent No.: US 6,615,353 B1
(45) Date of Patent: Sep. 2, 2003

(54) USER AUTHENTICATION METHOD AND USER AUTHENTICATION SYSTEM

(75) Inventor: Masahiro Hashiguchi, Fuchu (JP)

(73) Assignee: Yokogawa Digital Computer Corporation, Tokyo (JP)

( * ) Notice: Subject to any disclaimer, the term of this patent is extended or adjusted under 35 U.S.C. 154(b) by 0 days.

(21) Appl. No.: 09/118,149

(22) Filed: Jul. 17, 1998

(30) Foreign Application Priority Data

Jul. 23, 1997 (JP) .............................................. 9-196843

(51) Int. Cl.[7] .............................. H04L 9/08; H06F 15/16
(52) U.S. Cl. ...................... 713/185; 713/162; 713/167; 713/168; 713/185; 713/193; 713/201; 380/43; 380/262; 705/51
(58) Field of Search .................. 380/262, 43; 713/162, 713/167, 168, 185, 201, 193, 202, 183; 705/51

(56) References Cited

U.S. PATENT DOCUMENTS

| 5,253,295 A | * | 10/1993 | Saada et al. ................ 713/159 |
| 5,321,242 A | * | 6/1994 | Heath, Jr. .................... 235/382 |
| 5,506,905 A | * | 4/1996 | Markowski et al. ........ 380/262 |
| 5,560,008 A | * | 9/1996 | Johnson et al. ............. 713/201 |
| 5,590,199 A | * | 12/1996 | Krajewski et al. ............ 380/25 |
| 5,655,077 A | * | 8/1997 | Jones et al. ................. 713/201 |
| 5,802,176 A | * | 9/1998 | Audebert ...................... 380/23 |
| 5,812,776 A | * | 9/1998 | Gifford ....................... 709/217 |

OTHER PUBLICATIONS

Brown, M.R. et al. "Using Netscape 2" Second Edition. Que Corporation 1995. pp. 885–895.*
Neil Haller et al., Kaman Science Corporation, Internet Draft,A One–Time Password System, Jun. 12, 1995, p. 1–8.* e–Business Division, "FD Authentication"—"individual authentication" model on the Internet with a floopy disk, 2002, http://www.e–shop.co.jp/eb–eg/model/fd.*

AXENT Technologies, Inc, Defender, Secure, Two–Factor Strong Authentication, 2000.*

Menezes, A. J., et al. "Handbook of Applied Cryptography." CRC Press. CIP 1996. pp. 385–405.*

Brown, M. R. et al. "Using Netscape 2." Second Edition. Que Corporation. 1995. pp. 885–895.*

Newton, Harry. "Newton's Telecom Dictionary" 14th Edition. Telecom Books. 1998. p. 250.*

* cited by examiner

*Primary Examiner*—Gail Hayes
*Assistant Examiner*—Taghi T. Arani
(74) *Attorney, Agent, or Firm*—Moonray Kojima (57) ABSTRACT

A user authentication method and system which maintains reliable security using a low cost storage medium in place of cryptocards, wherein the system comprises control equipment and an operating section connected to the control equipment, and wherein the method comprises the steps of the operating section reading a storage medium that stores specific parameters, creating a user authenticaly code using a specific function from the specific parameters and other parameters provided by the control equipment, and supplying the created user authentication code to the control equipment, wherein the user authentication code sent from the operating section is compared with another code computed using a specific function generated by the control equipment, and when both codes are found to coincide, the control equipment causes information to be interchanged between the control equipment and the operating section. Advantageously, the invention method provides reliable security combined with low cost.

12 Claims, 6 Drawing Sheets

USER AUTHENTICATION METHOD AND USER AUTHENTICATION SYSTEM

BACKGROUND OF THE INVENTION

1. Field of Invention

This invention relates to a user authentication method and system; and more particularly, to user authentication in the "intranet" or "extranett". The invention may be used in a system that utilizes a one time password function and a storage medium, such as a floppy disk, as a physical key for authentication.

The term "intranet" as used herein is a system analogous to the internet, for example, constructed in a company, and "extranet" is a membership system intranet. Also, the term "one time password" as used herein means a password that varies with each use.

2. Description of the Prior Art

The following types of authentication systems are currently available in the art:

(1) Access function limitation in a web server. One of the functions of conventional web servers is the function of access limitation. This function has been used in systems where a user name and a password are inputted, such as in personal computer communication.

(2) Function of access limitation using cryptocards. The cryptocard is a type of electronic or smart card. If a user name is inputted, the host sends back an ID code. The prescribed computation is executed based on this ID code, and the code obtained as a result of the computation is transmitted to the host; which uses the code as the user authentication code.

There are many disadvantages and deficiencies with these prior art systems. For example, in the case of system (1), since the user name and password are inputted, it is possible for the user name and password to be stolen when passed through a transmission line. When stolen, it is very difficult to locate the source of the theft or the location of the destination of such theft. Also, if non-specific users are managed with this system, the resource provider may allow many non-specific users to access the user name and password. As another example, in the case of system (2), reliable security can be maintained by a challenge and response function (that is the user authentication code creation and notification of that code to the host). However, disadvantageously, such a system is expensive and the cryptocard itself is expensive, and furthermore the system is not economically effective for systems that do not require high grade security.

SUMMARY OF THE INVENTION

Accordingly, an object of the invention is to overcome the aforementioned and other disadvantages, problems, and deficiencies of the prior art.

Another object is to provide a user authentication method and system that can provide reliable security at low cost.

A further object is to provide such as system wherein a floppy disc is used as a storage medium, in place of the prior art use of cryptocards.

The foregoing and other features, advantages and objectives are attained in various aspects of the invention which encompasses a user authentication method and system, as set forth in greater detail hereinbelow.

A first aspect of the invention comprises a method using control equipment and an operating section connected to the control equipment and comprising the steps of reading a storage medium that stores specific parameters and creating a user authentication code from the specific parameters and other parameters provided by the control equipment using a specific function on the operating section side;

sending the created user authentication code to the control equipment;

comparing the user authentication code sent from the operating section with another code computed using a specific function generated in the control equipment on the control equipment side; and allowing the information to be inputted or outputted or otherwise interchanged between the control equipment and the operating section when both codes coincide as a result of the comparison.

According to a first configuration of the invention, information is inputted or outputted or otherwise interchanged between the control equipment and the operating section only when a user authentication code created in the operating section coincides with another code generated in the control equipment as a result of the comparison of the two codes. In this case, the user authentication code created in the operating section is prepared from a specific function using a storage medium storing specific parameters in advance, Consequently, reliable security is possible at low cost for users desiring access to the control equipment.

A floppy disk can be used as the storage medium, and the user name, last access client ID, last access date and time, sequential number and seed can be selected as the parameters to be record. With use of a floppy disk as the low cost storage medium, a low cost highly reliable authentication method and system are realized.

A second aspect of the invention encompasses a user authentication system comprising control equipment; an operation system connected to the control equipment; means for reading a storage medium storing specific parameters and for creating in the operating section a user authentication code using a specific function from the specific parameters and from other parameters provided by the control equipment; an authentication manager means for generating a specific code based on parameters sent from the storage medium using a specific function; an authentication web server means for downloading an applet for authentication to a browser that accesses the server for authenticating a URL (home based address) with a key sent from the operating section; and means for displaying a targeted page in a display section by acquiring the targeted page from the linked web server, respectively, in the control equipment.

According to the second aspect, information is inputted or outputted or otherwise interchanged between the control equipment and operating section only when a user authentication code, created in the operating section, coincides with another code generated in the control equipment as a result of the comparison of the two codes. In this case, the user authentication code created in the operating section is prepared from a specific function using a storage medium which stores the specific parameters in advance. Consequently, reliable security is realized with use of a low cost storage medium when the user desires to access the control equipment.

As with the prior configuration, advantageously, a floppy disk can be used as the storage medium, and the user name, last access client ID, last access date and time, sequential number and seed can be selected as the parameters to be recorded.

A third aspect of the invention encompasses a method for use in an information transmission system comprising a host and at least one terminal connected thereto and comprising the following steps:

reading a storage medium in which are stored specific parameters at the at least one terminal;

creating a user authentication code from the specific parameters using a specific function at the at least one termnial;

sending the created user authentication code and user name to the host from the at least one terminal;

comparing the user authentication code sent from the at least one terminal with another code using a host generated specific function in the host; and allowing the host to implement information transmission to the at least one terminal when the two codes coincide as a result of the comparision.

According to a third configuration of the invention, the information transmission is executed between the host and the at least one terminal only when the user authentication code created at the at least one terminal coincides with another code generated in the host as a result of the comparison of the two codes. In this case, the user authentication code created at the at least one terminal is prepared from a specific function using a storage medium which stores specific parameters in advance. Consequently, reliable security is maintained with a low cost storage medium when the user desires access to the host.

As with the previously discussed configuration, a floppy disk can be used as the storage medium and the user name, last access terminal ID, last access date and time sequential number and seed can be selected as the parameters to be recorded. Accordingly, for similar reasons, a low cost user authentication is realized having reliable security.

A fourth aspect of the invention encompasses an information transmission system comprising a host; at least one terminal connected to the host; means for reading a storage medium storing specific parameters and for creating a user authentication code from a specific function using the specific parameters in the at least one teminal; means for generating a user authentication code using a specific function based on parameters sent from the at least one terminal; and means for authenticating a user authentication code provided by the at least one terminal and for executing a specified user service when the two codes coincide as an authentication result.

According to a fourth configuration of the invention, information transmission is executed between the host and at least one terminal only when the user authentication code, created at the at least one terminal, coincides with another code generated in the host, as a result of the comparison of the two codes. In this case, the user authentication code created at the at least one terminal is prepared from a specific function using a storage medium which stores specific parameters in advance. Consequently, reliable security can be maintained using a low cost storage medium when the user desires to access the host. As with the other configurations, a floppy disk can be used as the storage medium and the user name, last access terminal ID, last access date and time, sequential number and seed can be selected as the parameters to be recorded.

DETAILED DESCRIPTION OF THE PREFERRED EMBODIMENTS

Figure 1:
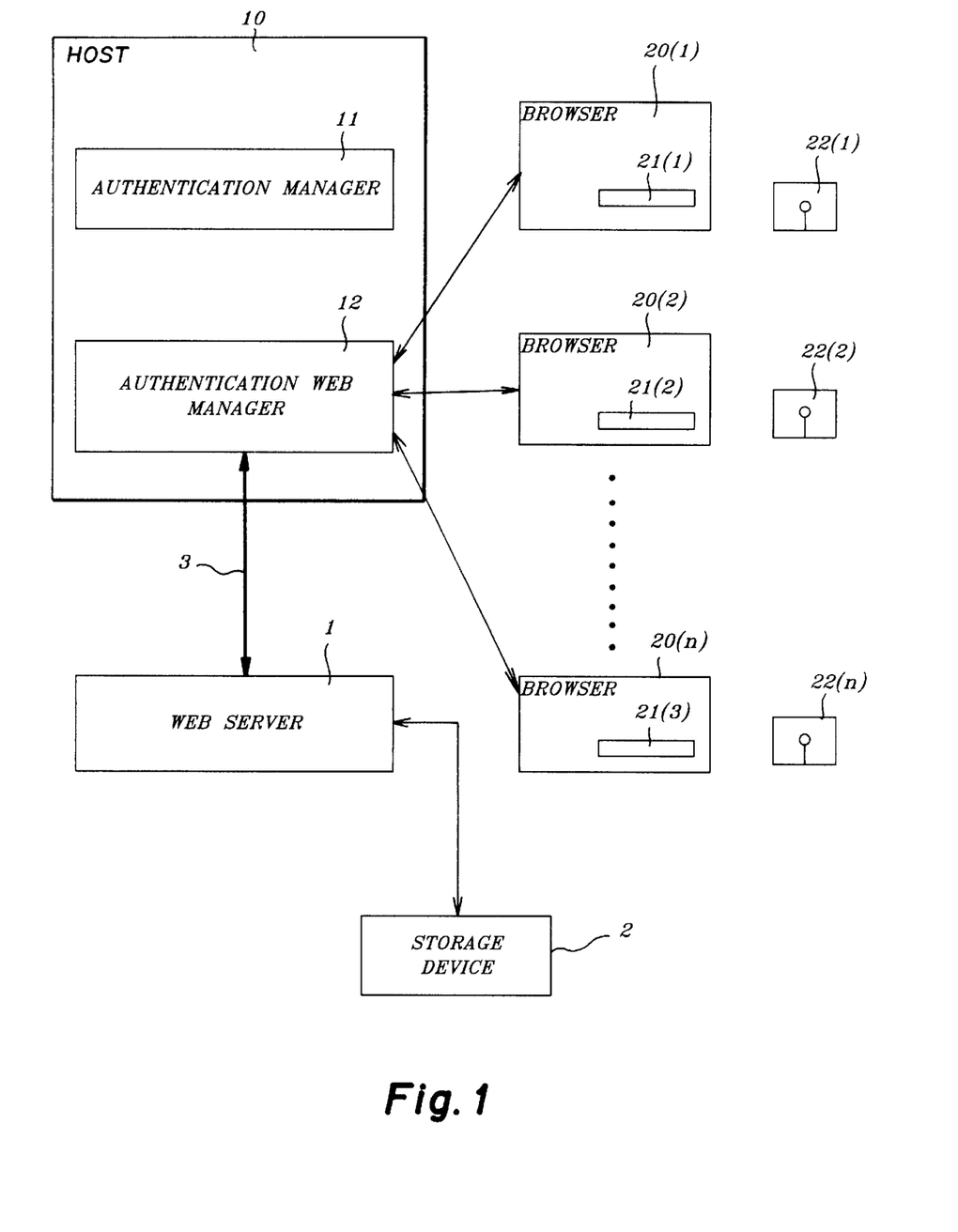
FIG. 1 is a block diagram depicting an illustrative embodiment of the invention.

FIG. 1 shows a host 10, an a plurality of browsers 20(1) . . . 20(n), as clients, connected to host 10. A floppy disk 22(1) . . . 22(n) used as a physical key for authentication is mounted in each browser 20(1) . . . 20(n). The following parameters, for example, are stored in the floppy disks 22(1) . . . 22(n). (a) user name. (b) last access client IP. (c) last access date and time. (d) sequential number. (e) seed. Item (b) is the IP (i.e. identification number) of a client who accessed last. The client IP is a number that a client independently has and thus each client has only one unique number. The sequential number (d) is a number that shows the number of access times, i.e. how many times the client has accessed. Seed (e) is an initial value that becomes the base of computation of a specific function.

In browser 20(1) . . . 20(n), there is an authentication code creating means 21(1) . . . 21(n), which creates user authentication codes using parameters stored in floppy disk 22(1) . . . 22(n) and the hash function, a specific function, from the parameters sent from host 10.

Host 10 comprises an Authentic Manager 11 which creates hash codes (e.g. authentication codes) using a hash function, a specific function, based on the parameters stored in a device contained therein. The manager 11 compares the hash code from a browser with the just mentioned prepared hash code and passes a key to the browser when both hash codes coincide as a result of the comparison. The host 10 also comprises an Authentication Web Manager 12 which sends an applet for authentication to the browser 20(1) . . . 20(n) that accesses the Authentication Web Manager 12. The Web Manager 12 also authenticates a URL (i.e. home page address) with a key sent from a browser 20(1) . . . 20(n) and acquires a targeted page from the linked Web Server 1 and sends the targeted page out to the browser 20(.) . . . 20(n) when both user authentication codes coincide as an authentication result.

As used herein, the term "applet" is a JAVA program operated in a browser. Browsers 20(1) . . . 20(n) are connected to host 10 via authentication web manager 12, as depicted in FIG. 1.

An existing Web Server 1 is connected to Authentication Web Manager 12 via link 3. A storage device 2 is connected to the Web Server 1 and stores, for example, home page information. The operation of the system shown in FIG. 1 is discussed hereinbelow.

SUMMARY OF OPERATION (1) A client accesses authentication web manager 12 as if accessing an ordinary web page from browser 20(1) . . . 20(n).

(2) Authentication Web Manager 12 sends an applet for the Browser 20(1) . . . 20(n).

(3) Browser 20(1) . . . 20(n) reads user information from a floppy disk 22(1) . . . 22(n) of the client using the downloaded applet for authentication, and computes parameters stored in the floppy disk 22(1) . . . 22(n) using the hash function, and creates a user authentication code.

(4) The applet for authentication sends out the created user authentication code to Authentication Manager 11 via Authentication Web Manager 12.

(5) Authentication Manager 11 executes computation using a hash function in host 10, generates a code, and compares this code with the user authentication code sent from the browser 20(1) . . . 20(n). Authentication manager 11 then sends the authentication result to the applet for authentication in browser 20(1) . . . 20(n).

(6) The applet for authentication, when authentication is successfully completed, accesses the authentication web manager 12 with the URL with a key so that the targeted page is displayed.

Figure 2:
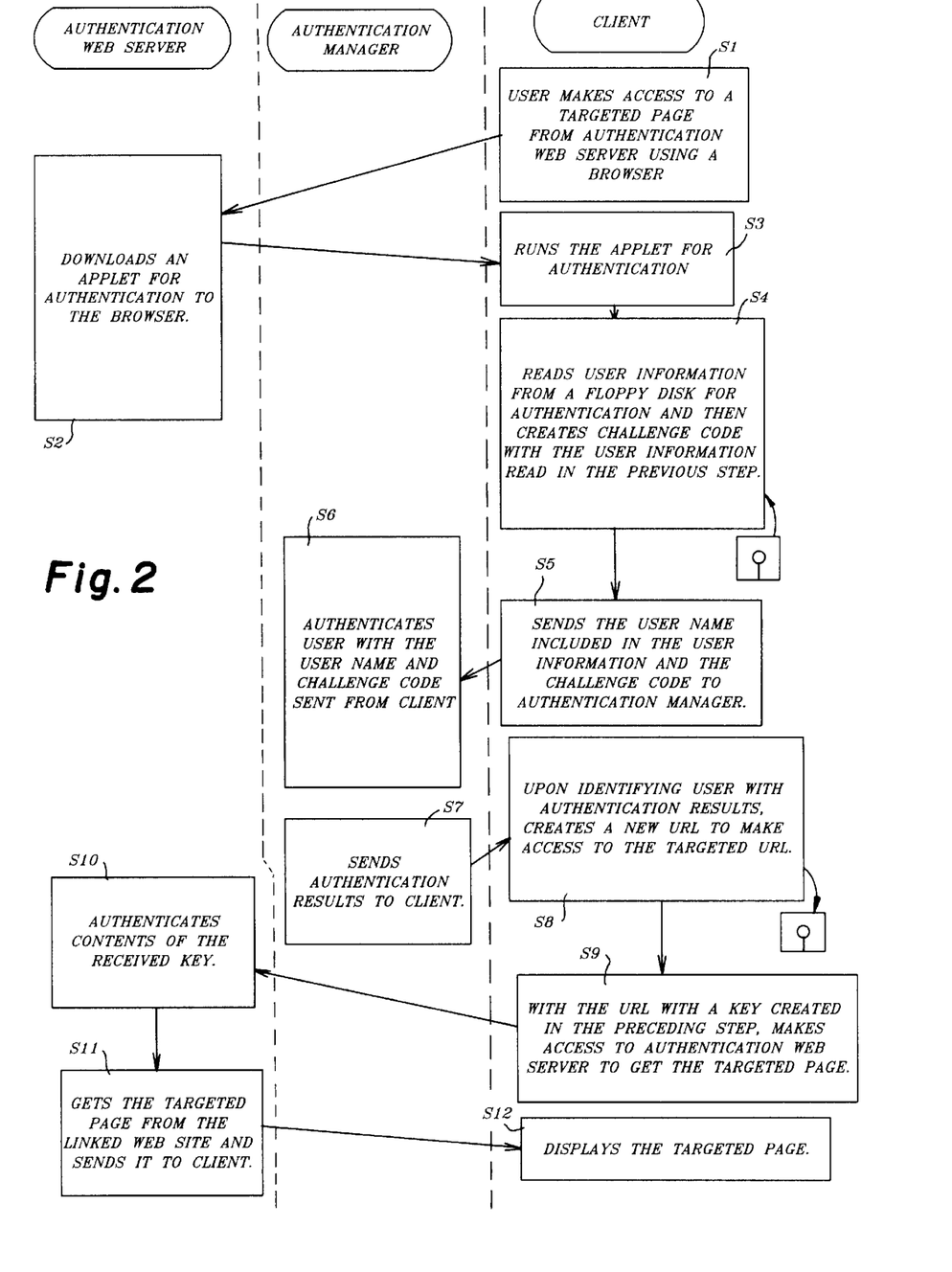
FIG. 2 is a flow chart depicting operation of the invention.

FIG. 2 shows a flow chart showing operation of the embodiment of FIG. 1. Browser 20(1) . . . 20(n) (labeled "CLIENT" in FIG. 2) accesses a targeted page through Authentication web Manager 12 (labeled "Authentication Web Server" in FIG. 2) (Step S1 ). Receiving this access, Authentication Web Manager 12 sends an applet for authentication to the browser 20(1) . . . 20(n) (Step S2). It is to be understood that even though a plurality of identifying numbers are listed, such as 20(1) . . . 20(n) for the browser, a particular one or more thereof is being used at a time.

The client runs the applet for authentication when the applet for authentication is downloaded (Step S3). The applet for authentication reads the parameters from a floppy disk 22(1) . . . 22(n) (See the floppy disk symbol in FIG. 2) for authentication and creates a user authentication code (e.g. challenge code) using hash function. In this case the seed including parameters for computation of hash function is sent from Authentication Web Manager 12. Thus, the applet for authentication creates a unique challenge code from the hash function using the seed and user name, last access date and time, and sequential number stored in the floppy disk 22(1) . . . 22(n).

Browser 20 reads the user information and the challenge code for authentication (Step S4) and sends the user name and challenge code to Authentication Manager 11 (Step S5).

Authentication Manager 11 creates a code from the hash function using the last access date and time and sequential number stored in the host 10 in advance based on the sent user name and challenge code, and compares the created code with the challenge code sent from browser 20(1) . . . 20(n). The result of the comparison is sent to the client from Authentication Manager 11 (Step S7). At that time, since it is the authentication result that is sent and not the password, there is no possibility of the password being stolen.

On the client side that receives the authentication result, when browser 20(1) . . . 20(n) identifies the user from the authentication result, browser 20(1) . . . 20(n) creates a new URL to access the targeted URL (Step S8). Next, browser 20(1) . . . 20(n) accesses the Authentication Web Manager 12 with the URL with the key created in Step S8 (Step S9). Browser 20(1) . . . 20(n) updates the contents of the floppy disk 22(1) . . . 22(n) at the same time. Authentication Web Manager 12 authenticates the contents of the key sent from browser 20(1) . . . 20(n) (Step S10), acquires a targeted page from the linked Web Server 1, and sends the targeted page out to the client (Step S11). On the client side, the targeted page is indicated in the display of browser 20(1) . . . 20(n) (Step S12).

As described, the information transmission is executed between host 10 and browser 20(1) . . . 20(n) only when the user authentication code (e.g. challenge code) created in the browser 20(1) . . . 20(n) coincides with another code generated in the host 10 as a result of comparison of the two codes. In this case, the user authentication code (eg challenge code) is created from a specific function (e.g. hash function) using a floppy disk 22(1) . . . 22(n) having stored therein in advance specific parameters. Consequently, reliable security is maintained using a low cost storage medium when the user desires to access the host 10.

In addition, advantageously, since a floppy disk 22(1) . . . 22(n) can be used as a storage medium, there is realized by the invention, a low cost authentication method and system, wherein reliable security is maintained without necessity of using cryptocards.

Figure 3:
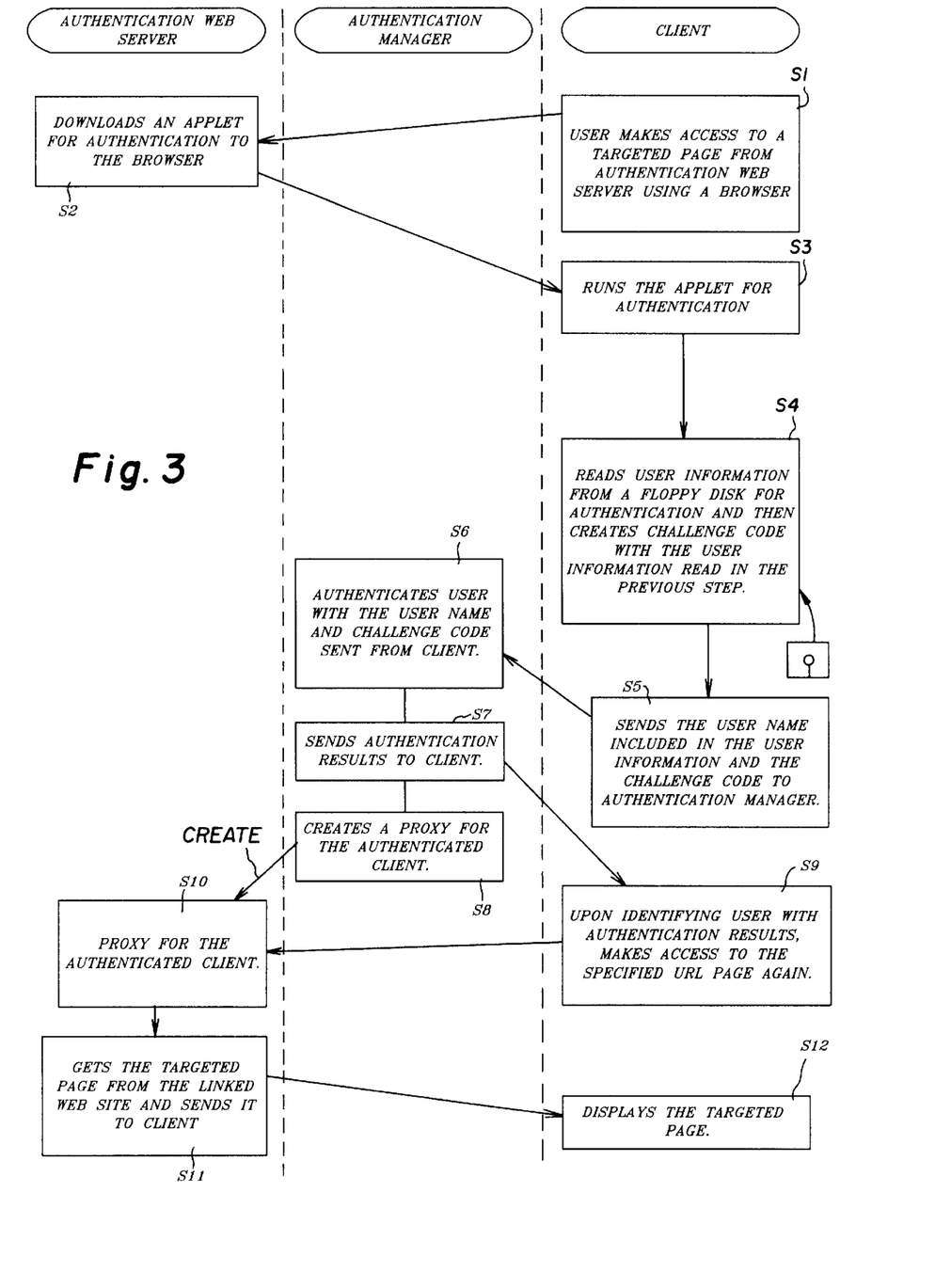
FIG. 3 is a flow chart depicting operation of another embodiment of the invention.

FIG. 3 is a flow chart similar to FIG. 2 and represents operation of another embodiment of the invention, wherein omitted is use of the URL with a key. An arbitrary one of browsers 20(1) . . . 20(n) accesses a targeted page through Authentication Web Manager 12 (Step S1 ). Receiving this access, Authentication Web Manager 12 sends an applet for authentication to browser 20(1) . . . 20(n). (Step S2).

The client runs the applet for authentication when it is downloaded (Step S3). The applet for authentication reads the parameters from a floppy disk 22(1) . . . 22(n) for authentication and creates a user authentication code (eg challenge code) using a hash function. In this case, the seed including parameters for computing the hash function is sent from the Authentication Web Manager 12. Thus, the applet for authentication creates a unique challenge code from the hash function using the seed and user name, last access date and time, and sequential number stored in the floppy desk 22(1) . . . 22(n).

Browser 20(1) . . . 20(n) reads the user information and challenge code for authentication (Step S4), and sends the user name and challenge code to Authentication Manager 11 (Step 55).

Authentication Manager 11 creates a code from the hash function using the last access date and time and sequential number stored in the host 10 in advance, based on the user name and challenge code sent from the browser 20(1) . . . 20(n) and compares the created code with the challenge code (Step S6). The result of the comparison is sent to the client from Authentication Manager 11 (Step S7). At that time, since it is the authentication result that is sent and not the password, there is no possibility of the password being stolen.

Next, Authentication Manager 11 creates a proxy for the authenticated client (i.e. proxy process for communicating with the targeted Web Server 1) and sends it to the Authentication Web Manager 12 (Step S8). Concurrently, on the client side, browser 20(1) . . . 20(n) accesses the specified URL page again via Authentication Web Manager 12 upon identifying the user with the authentication result (Step S9). Browser 20(1) . . . 20(n) updates the contents of the floppy disk 22(1) . . . 22(n) at the same time.

Authentication Web Manager 12 identifies the client using the proxy for the authenticated client (Step S10). When the client is authenticated, the Manager 12 acquires the targeted page from the linked web server 1 and sends-it out to the client (Step S11). On the client side, the targeted page is indicated in the display of the browser 20(1) . . . 20(n) (Step S12).

Information transmission is executed between the host 10 and the browser 20(1) . . . 20(n) only when the user authentication code (eg challenge code) created in the browser 20(1) . . . 20(n) coincides with another code generated in the host 10 as a result of comparison of the two codes. In this case, the user authentication code is created from a specific function (eg hash function) using a floppy disk 22(1) ... 22(n) which has stored previously therein the specific parameters. Consequently, reliable security is maintained at low cost when the user desires to access the host.

In addition, since a floppy disk can be used as the storage medium, a low cost user authentication method can be realized by the invention.

Figure 4:
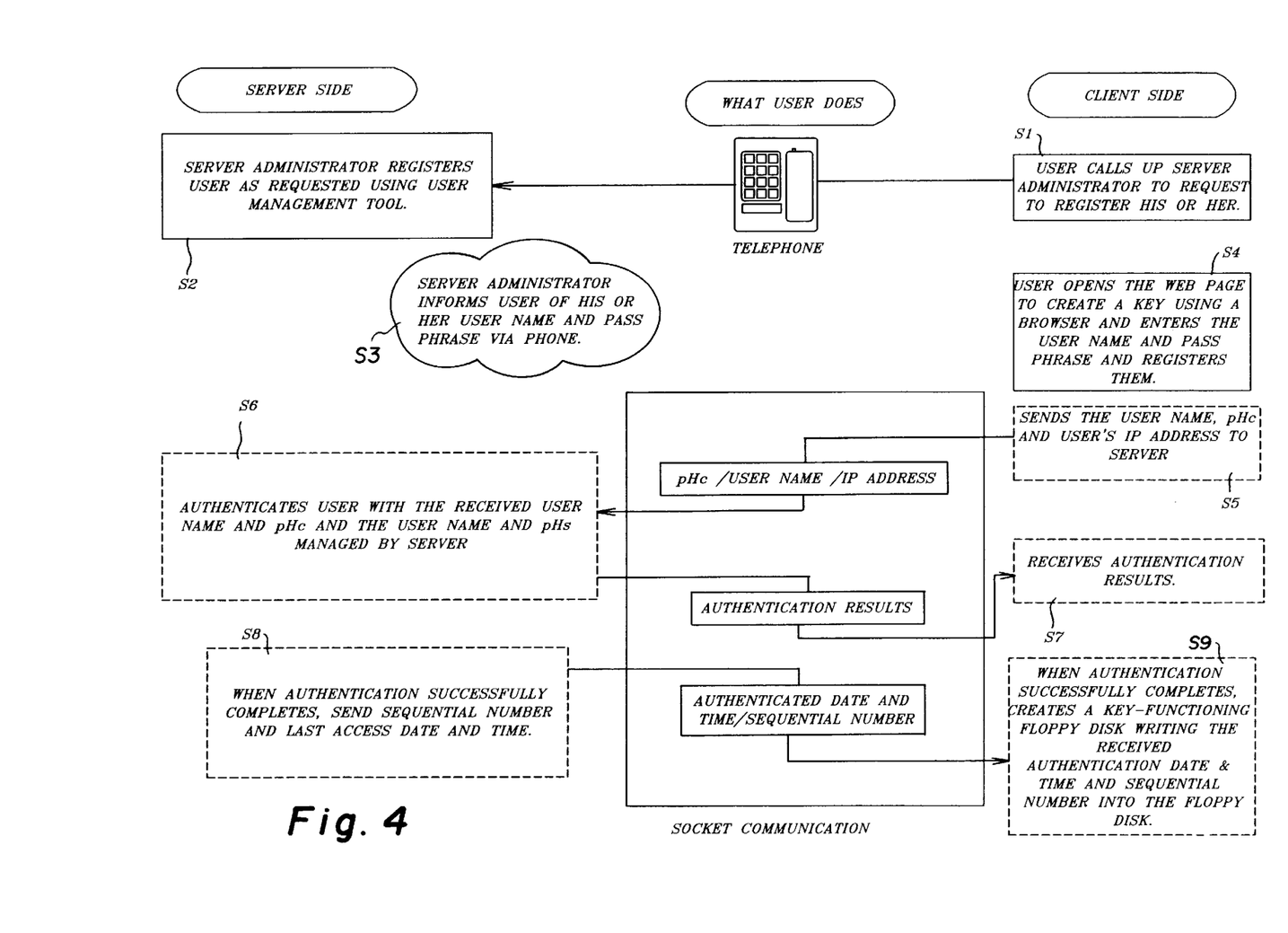
FIG. 4 is a flow chart depicting operation for preparing a floppy disk with a key.

FIG. 4 shows a floppy disk preparation operation with a key, wherein from the client side, the user calls up a Server Administrator to request registration of himself or herself (Step S1). On the server side, the Server Administrator registers the user as requested using a User Management Tool (Step S2). The Server Administrator informs the user of his or her user name and the pass-phrase by telephone (Step S3).

On the client side, the user opens a web page to create a key using a browser, sets the user name and the pass phrase to the applet to create a key, and clicks on [GO] (Step S4). Next, the user sends the user name, pHc, and user's IP address to the Server (Step S5). The Server authenticates the user with the received user name and pHc (i.e. the user authentication code created on the client side) and using the user name and pHs (i.e. authentication code crated on the Server side) managed by the Server (Step S6).

When authentication is completed, the Server informs the client of the authentication result. The client receives the authentication result (Step S7). Next, when authentication is successfully completed, the Server sends out a sequential number (Sq.No.) and the last access date and time (Step S8). On the client's side, a key functioning floppy disk is created for writing the received authentication date and time and the sequential number when authentication is successfully completed (Step S9).

Figure 5:
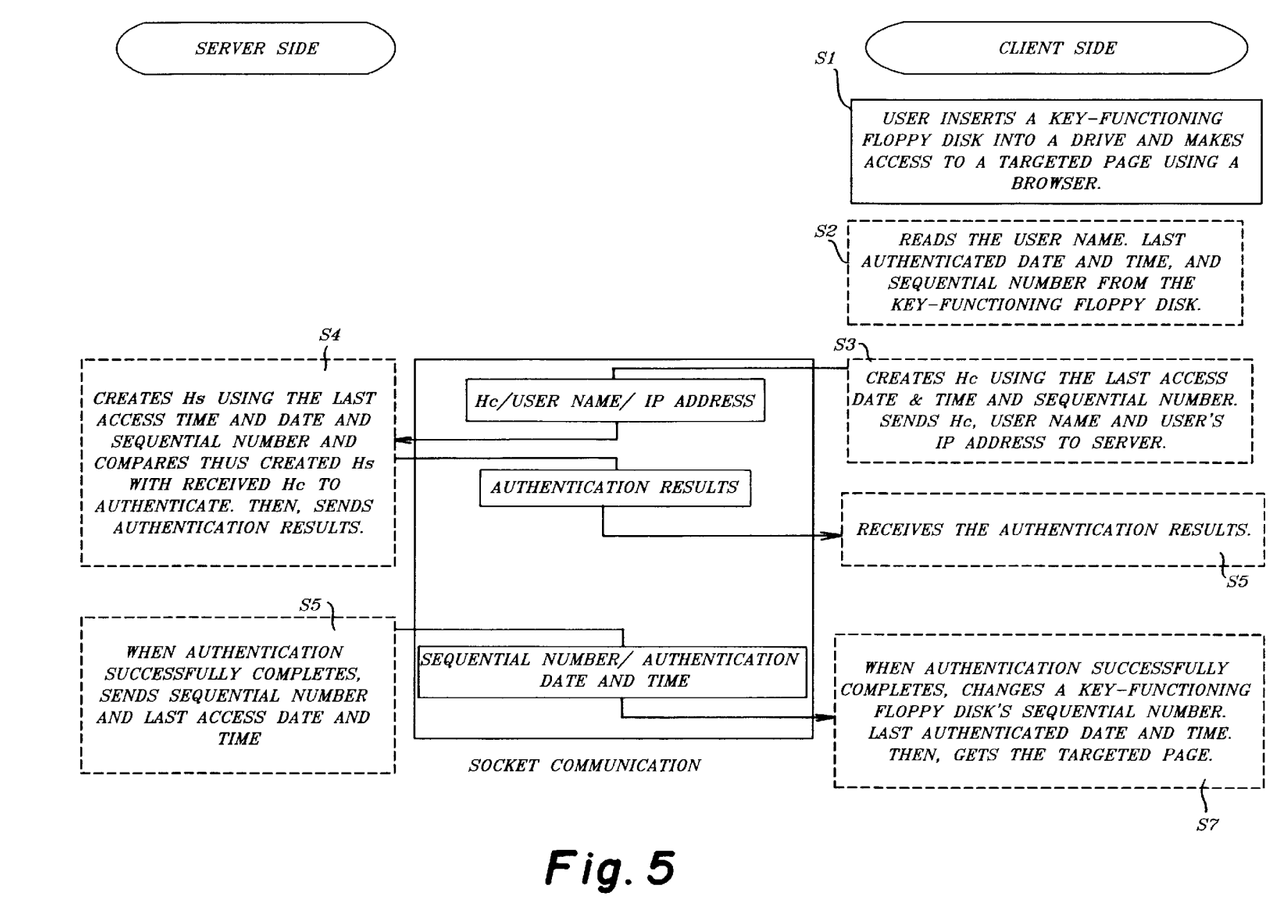
FIG. 5 is a flow chart depicting authenticating action during operation.

FIG. 5 shows a flow chart representing authenticating actions during usual operation. First, on the client side, a user inserts a key functioning floppy disk 22(1) ... 22(n) into a drive and accesses a targeted page using a browser 20(1) ... 20(n) (Step S1 ). Next, the browser 20(1) ... 20(n) reads the user name, last authenticated date and time (i.e. last access date and time), and a sequential number from the key functioning floppy disk 22(1) ... 22(n). (Step S2). The browser 20(1) ... 20(n) creates a challenge code Hc using the last access date and time and the sequential number and sends the Hc, the user name and user's IP address to the Server (Step S3).

The Server creates an authentication code Hs using the last access date and time and the sequential number, compares the created Hs with the received Hc for authentication, and then sends the authentication result to the client side (Step S4).

On the client side, the browser 20(1) ... 20(n) receives the authentication result (Step 55). On the Server side, when the authentication is successfully completed, the Server sends out the sequential number and the last access date and time to the client (Step S6). On the client side, when the authentication is successfully completed, the browser 20(1) ... 20(n) updates the sequential number, the last authenticated date and time, and the last access client IP on the key functioning floppy disk 22(1) ... 22(n) and then accesses the Authentication Web Manager 12 to indicate the targeted page (Step S7).

Figure 6:
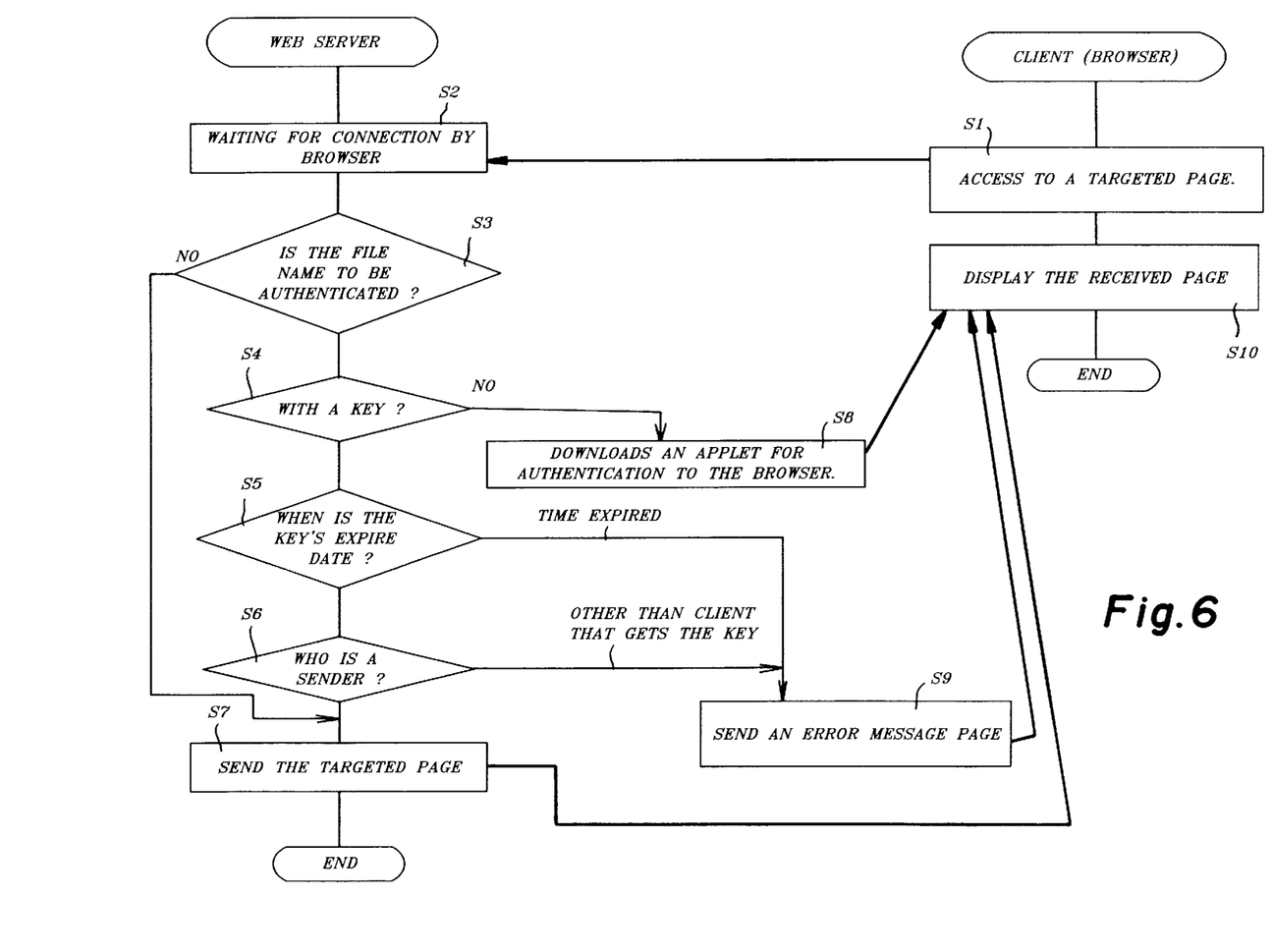
FIG. 6 is a flow chart depicting access limiting operation by the invention.

FIG. 6 shows a flow chart representing the access limiting operation performed by the invention. When the browser 20(1) ... 20(n) on the client side access a target page (Step S1), since the web server 1 is waiting for connection by the browser 20(1) ... 20(n), (Step S2), the web server 1 checks whether or not the acquired file name is to be authenticated upon being accessed from the browser 20(1) ... 20(n) (Step S3).

If the file is to be authenticated, the web server 1 checks whether the file has a key (Step S4). If it is a file with a key, the web server 1 checks the key's expiry date (Step S5). If the expiry date is not yet reached, the web server checks who is the sender, that is whether or not the sending source of the key is the specified client (Step S6). If the sending source of the key is the specified client, the web server sends out the data of the targeted page to the specified client (Step S7). The specified client receives the sent page data (Step S10).

If the acquired file is not/ requird to be authenticated in Step S3, the web server 1 sends out the data of the targeted page to the client (Step S7) and the dent receives the data (Step S10).

On the other hand, if the file is required to be authenticated, but not with a key in step S4, the web server 1 downloads a page of an applet for authentication to the browser 20(1) ... 20(n) on the client side (Step S8) and the client receives this page of the applet for authentication (Step S10). If, in Step S5, the key's expiry date has been reached, the web server 1 sends an error message page to the client (Step S9), and the client receives the error message page (Step S10).

In addition, in Step S6, if the sending source of the key is other than the client who acquired the key, the web server 1 sends and error message to the client (Step S9), and the client receives the error message page (Step S10).

Data transmission between the host 10 and at least one browser 20(1) ... 20(n) and the user authentication method according to the invention are not limited to the foregoing discussion. The invention can also be similarly applied where the user accesses an independent control equipment (eg personal computer )from an operating section (eg keyboard). Also, in this case, a low cost floppy disk can be used as the physical key.

According to the invention, advantageously, the information is inputted or outputted or otherwise interchanged between the control equipment and the operating section only when the user authetication code created in the operating section coincides with the code created or generated in the control equipment as a result of comparison of the two codes. In this case, the user authentication code created in the operating section is prepared from a specific function using a storage medium which stores specific parameters in advance. Consequently, the invention realizes reliable security with low cost whever the user desires to access the control equipment.

Also, advantageously, the invention uses floppy disks as the storage medium, and the parameters to be recorded therein are the user name, last access client IP, last access date and time, sequential number and seed. Such use of floppy disks enables the invention to provide reliable security of authentication at low cost, and without requirement of cryptocards, as done in the prior art.

The foregoing description is illustrative of the principles of the invention. Numerous extensions and modifications thereof would be apparent to the worker skilled in the art. All such extensions and modifications are to be construed to be within spirit and scope of the invention.

What is claimed is:

1. An authentication method using a one time authentication code, and comprising the steps of:

in advance of a current authentication request, writing in a reusable particular storage means disposed in an operating section, authentication purpose information comprising:

a changeable user identification parameter, an unchangeable unique parameter assigned to said particular storage means, and a changeable access parameter which includes date and time and sequence number of a prior authentication request using said particular storage means, so that no separate input mechanism is required to supply input data for personal identification at time of an authentication request, wherein said particular storage means is interchangeable with a plurality of similar storage means with each storage means having an unchangeable unique different parameter assigned thereto and also having stored therein other parameters similar to those stored in said particular storage means, and with the same one of said changeable user identification parameter being written into one or more of said plurality of storage means;

storing in a control section authentication purpose information comprising said changeable user indentification parameter, said unchangeable unique parameter assigned to said particular storage means; and said changeable access parameter including date and time and sequence number of said prior authentication request;

requesting current authentication without use of an input mechanism to input data for personal identification at time of requesting authentication by reading said authentication purpose information from said particular storage means;

creating a one time current authentication code from said authentication purpose information read from said particular storage means, said authentication purpose information comprising said changeable user indentification parameter, said unchangeable unique parameter assigned to said particular storage means, and said changeable access parameter including date and time and sequence number of a prior authentication request, and using a first specific function based on priorly stored information;

sending said one time current authentication code and said user identification parameter from said operating section to said control section;

creating in said control section a current checking code from said one time current authentication code and said user identification parameter sent from said operating section and using a second special function based on priorly stored information including date and time and sequence number of a prior authentication request from the same particular storage means and corresponding to said user identification parameter;

updating said access parameter with respect to date and time and sequence number of said current authentication request for the corresponding unchangeable unique parameter assigned to said particular storage means and corresponding to said user identification parameter;

storing in said control section said updated access parameter;

comparing said one time current authentication code and said current checking code for authentication;

sending results of authentication back to said operating section; and providing said particular storage means with an updated access parameter identifying the updated date and time and sequence number of the current authentication request, whereby security is maintained keeping the unique parameter assigned to a particular storage means in a form which cannot be accessed by any outside means.

2. The method of claim 1, wherein a proxy is created in said control section and is used in the comparing step.

3. The method of claim 1, wherein said operating section obtains an applet from said control section and said applet obtains said access parameter from said particular storage means and provides information to said particular storage means for updating said access parameter in said particular storage means.

4. An authentication systems comprising:

a reusable particular storage means which is interchangeable with a plurality of similar storage means;

an operating section comprising said particular storage means; and a control section connected to said operating section; wherein:

in advance of a current authentication request, writing in said particular storage means, authentication purpose information comprising: a changeable user identification parameter, an unchangeable unique parameter assigned to said particular storage means, and a changeable access parameter which includes date and time and sequence number of a prior authentication request using said particular storage means, so that no separate input mechanism is required to supply input data for personal identification at time of an authentication request, wherein said particular storage means is interchangeable with said plurality of similar storage means with each storage means having an unchangeable unique different parameter assigned thereto and also having stored therein other parameters similar to those stored in said particular storage means, and with the same one of said changeable user identification parameter being written into one or more of said plurality of storage means;

storing in said control section authentication purpose information comprising said changeable user identification parameter, said unchangeable unique parameter assigned to said particular storage means, and said changeable access parameter including date and time and sequence number of said prior authentication request;

requesting current authentication without use of an input mechanism to input data for personal identification at time of requesting authentication by reading said authentication purpose information from said particular storage means;

creating a one time current authentication code from said authentication purpose information read from said particular storage means, said authentication purpose information comprising said changeable user identification parameter, said unchangeable unique parameter assigned to said particular storage means, and said changeable access parameter including date and time and sequence number of a prior authentication request, and using a first specific function based on priorly stored information;

sending said one time current authentication code and said user identification parameter from said operating section to said control section;

creating in said control section a current checking code from said one time current authentication code and said user identification parameter sent from said operating section and using a second special function based on priorly stored information including date and time and sequence number of a prior authentication request from the same particular storage means and corresponding to said user identification parameter;

updating said access parameter with respect to data and time and sequence number of said current authentication request for the corresponding unchangeable unique parameter assigned to said particular storage means and corresponding to said user identification parameter;

storing in said control section said updated access parameter;

comparing said one time current authentication code and said current checking code for authentication;

sending results of authentication back to said operating section; and providing said particular storage means with an updated access parameter identifying the updated date and time and sequence number of the current authentication request, whereby security is maintained by keeping the unique parameter assigned to a particular storage means in a form not identifiable by any outside means.

5. The system of claim 4, further comprising means for creating a proxy in said control section to be used in place of a user.

6. The system of claim 4, wherein said operating section comprises means for obtaining an applet from said control section and wherein said applet obtains said access parameter from said operating section and provides information to update said access parameter.

7. An authentication method using a system comprising a control section and an operating section, said method comprising the steps of:

reading from a particular storage means authentication information previously written in said particular storage means, said authentication information comprising a changeable user information parameter, an unchangeable unique parameter assigned to said particular storage means, and a changeable access parameter including date and time and sequence number of a prior authentication request using that particular storage means, wherein said particular storage means is interchangeable with a plurality of similar storage means, each having written thereinto a different unique parameter assigned thereto;

creating a one time current authentication code using said authentication information read from said particular storage means and using a first specific function based on priorly stored information so that said unchangeable unique parameter assigned to said particular storage means cannot be identified by any outside source;

sending to said control section said one time current authentication code together with said user information parameter obtained from said reading step;

creating a current checking code in said control section using said user identification and a second specific function based on previously stored information; and comparing said current authentication code and said current checking code for authentication; whereby security of access is maintained by keeping secret from outside influence at least the unique parameter assigned to said particular storage means.

8. The method of claim 7, wherein said storage means is a floppy disk.

9. An authentication method wherein a user with a browser accesses an authentication manager and an authentication web server connected to a network, said method comprising the steps of:

said user accesses a targeted page from said authentication web server using said browser;

said web server sending an applet for authentication to said browser;

using said applet in said browser for authentication;

reading user information including user name from a storage disk for authentication;

creating a challenge code with said user information, an unchangeable unique parameter assigned to said storage disk, and a changeable access parameter which includes date and time and sequence number of a prior authentication request read from said storage disk; and sending said user name and said challenge code to said authentication manager; said authentication manager then:
authenticating the user by analyzing user name and challenge code, and
then sending authentication results to said browser; said browser upon identifying said user with the authentication results:
creating a new Uniform Resource Locator to access a targeted page, and
accessing the web server using said new Uniform Resource Locator and a key to obtain said targeted page;

said web server:
authenticating the received new Uniform Resource Locator and
thereafter obtaining the targeted page from a linked web site and then
sending the targeted page to said browser; and
said browser causing display of said targeted page.

10. The method of claim 9, wherein said authentication manager concurrently with sending of authentication results to said browser, creates a proxy for the authenticated user and sends said proxy to said web server; and wherein said browser accesses the web server without using any key to obtain the targeted page.

11. An apparatus on a computer readable medium for authenticating a user, comprising:

an authentication manager, a browser and a web server; wherein
said browser comprises means for accessing a targeted page from said web server;
said web server comprises means for sending an applet for authentication to said browser;
said browser comprising means for running said applet for authentication, a storage disk for reading using information including user name from said storage disk for authentication, means for creating a challenge code with said user name, an unchangeable unique parameter assigned to said storage disk, and a changeable access parameter which includes date and time and sequence number of prior authentication request read from said storage disk, and means for sending said user name and said challenge code to said authentication manager;
said authentication manager comprising means for the authentication of said user of said browser by analyzing user name and challenge code, and means for then sending authentication results to said browser;

said browser further comprising means upon identifying said user with the authentication results for creating a new Uniform Resource Locator and key to access a targeted page, and means for accessing the web server using said new Uniform Resource Locator and key to obtain the targeted page;

said web server further comprising means for authenticating the received new Uniform Resource Locator and key and means for thereafter obtaining the targeted page from a linked web site and sending the targeted page to said browser; and said browser causing display of the targeted page.

12. The apparatus of claim 11, wherein said authentication manager comprises means for creating a proxy for the authentication user concurrently with the sending of the authentication results to said browser; and wherein said web server further comprises means for using said proxy for the authentication user in place of the key from the browser.

* * * * *